United States Patent
Chang et al.

(10) Patent No.: US 8,054,420 B2
(45) Date of Patent: Nov. 8, 2011

(54) LIQUID CRYSTAL DISPLAY DEVICE AND METHOD OF FABRICATING THE SAME

(75) Inventors: Sung-Soo Chang, Seoul (KR); Woo-Hyun Kim, Seoul (KR); Jin-Ho Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 12/683,756

(22) Filed: Jan. 7, 2010

(65) Prior Publication Data

US 2010/0110349 A1 May 6, 2010

Related U.S. Application Data

(62) Division of application No. 11/643,499, filed on Dec. 20, 2006, now Pat. No. 7,667,797.

(30) Foreign Application Priority Data

Dec. 30, 2005 (KR) .............................. 2005-0135941

(51) Int. Cl.
*G02F 1/1335* (2006.01)
*G02F 1/13* (2006.01)
(52) U.S. Cl. .................. 349/106; 349/113; 349/187
(58) Field of Classification Search .................. 349/104, 349/106–109, 113–115, 187
See application file for complete search history.

(56) References Cited

U.S. PATENT DOCUMENTS

| 6,683,667 B2* | 1/2004 | Jin et al. .......................... 349/113 |
| 2003/0123003 A1 | 7/2003 | Choi et al. |
| 2003/0218698 A1 | 11/2003 | Otake et al. |
| 2004/0012736 A1 | 1/2004 | Jeon et al. |
| 2004/0105054 A1 | 6/2004 | Seki et al. |
| 2007/0109473 A1* | 5/2007 | Higa et al. ...................... 349/114 |
| 2007/0121037 A1* | 5/2007 | Arai et al. ....................... 349/113 |
| 2011/0141413 A1* | 6/2011 | Sakai et al. ..................... 349/110 |

* cited by examiner

*Primary Examiner* — Kevin S Wood
(74) *Attorney, Agent, or Firm* — Brinks Hofer Gilson & Lione

(57) ABSTRACT

A liquid crystal display device includes an array substrate having reflective and transmissive regions in a pixel region, wherein the array substrate includes a reflective electrode corresponding to the reflective region and a pixel electrode on a first substrate. A color filter substrate defines the reflective region and the transmissive region in the pixel region. The color filter substrate includes a color filter with first and second portions that correspond to the respective transmissive and reflective regions on a second substrate. The thickness of the second portion is less than a thickness of the first portion. The combined thickness of the scatter and the thickness of the second portion is greater than the thickness of the first portion; and a liquid crystal layer between the array and color filter substrates.

29 Claims, 7 Drawing Sheets

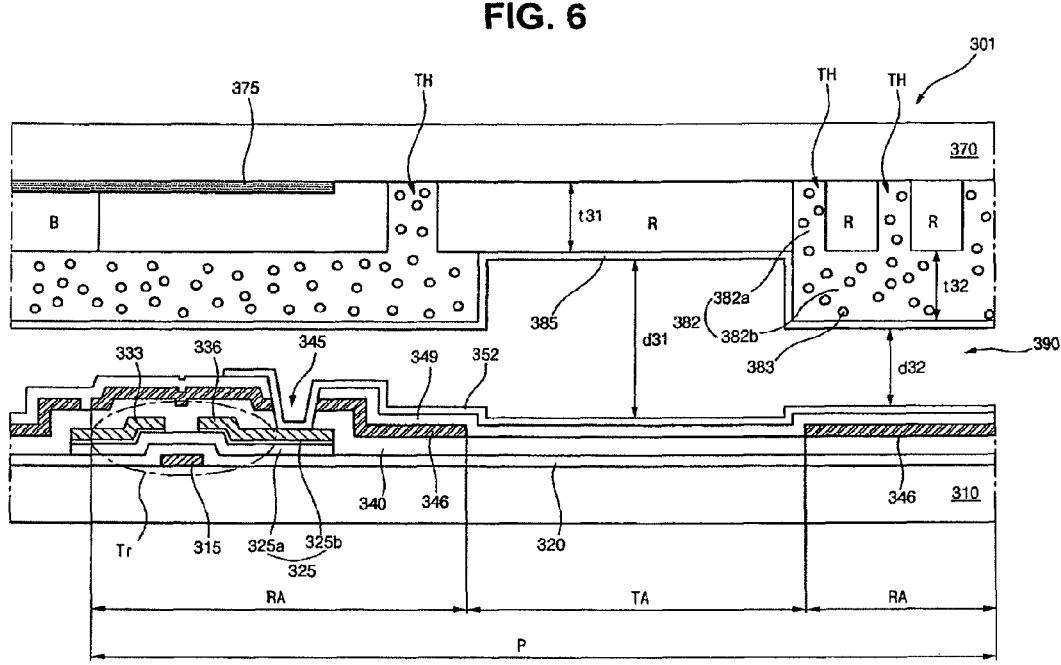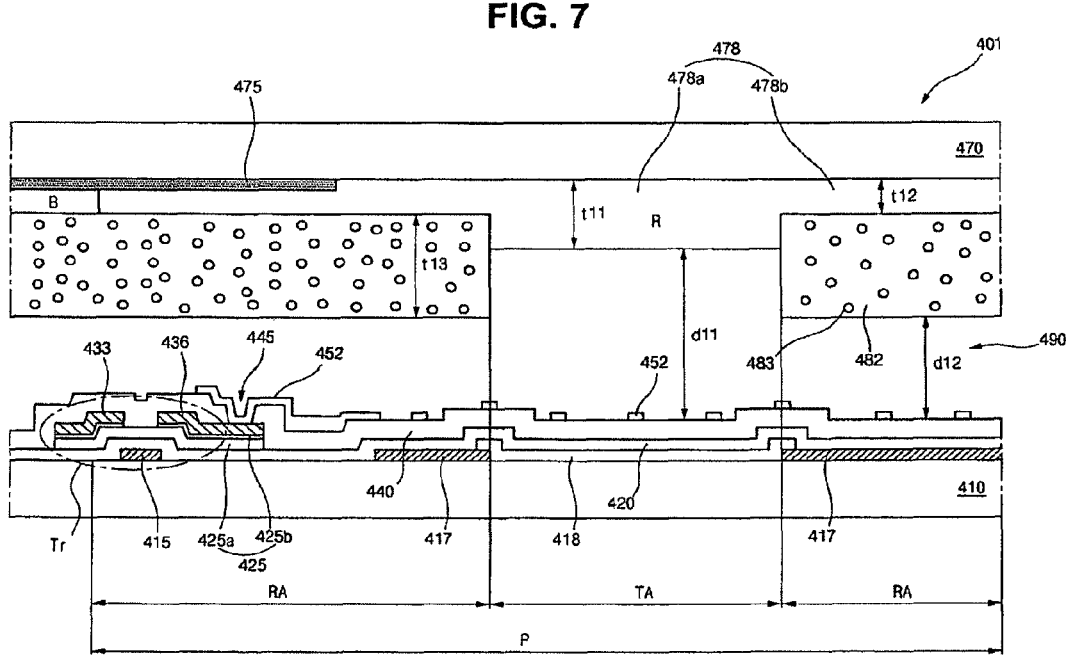

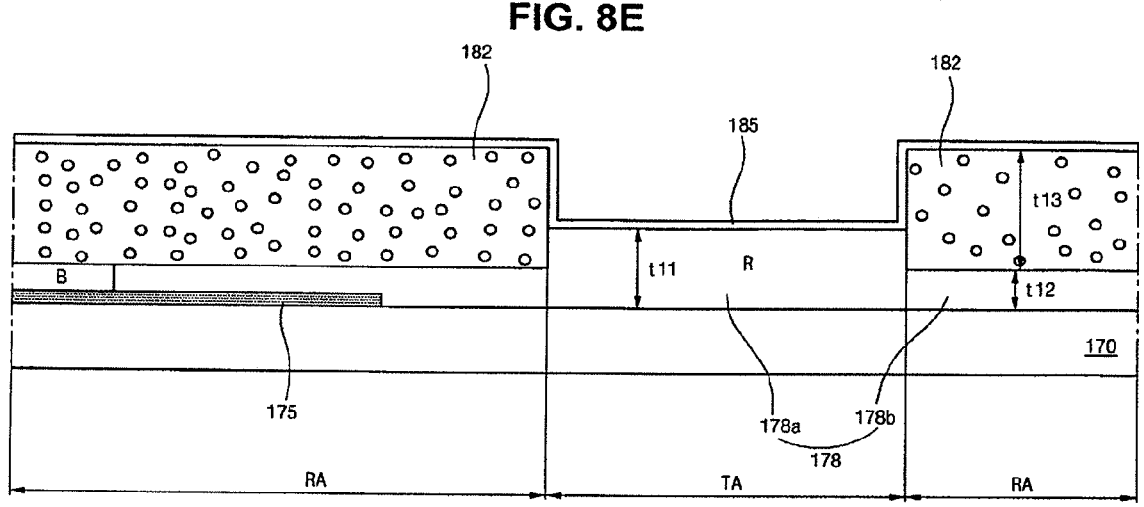

LIQUID CRYSTAL DISPLAY DEVICE AND METHOD OF FABRICATING THE SAME

The present patent document is a divisional of U.S. patent application Ser. No. 11/643,499, filed Dec. 20, 2006, now U.S. Pat. No. 7,667,797, which claims priority to Korean Patent Application No. 2005-0135941 filed in Korea on Dec. 30, 2005, which is hereby incorporated by reference.

BACKGROUND

1. Field of the Invention

The present invention relates to a liquid crystal display device, and more particularly, relates to a liquid crystal display device and a method of fabricating the same.

2. Discussion of the Related Art

Many types of flat panel displays have been developed to serve as substitutes for cathode-ray tubes (CRTs), such as liquid crystal display (LCD) devices, plasma display panels (PDPs), field emission displays, and electro-luminescence displays (ELDs). LCD devices have many advantages over CRTs, including higher resolution, thinner profile, more compact size, and lower power usage during operation.

LCD devices generally include two substrates that are spaced apart and face each other and a liquid crystal layer interposed between the two substrates. The two substrates also include electrodes that face each other such that a voltage applied between the electrodes induces an electric field across the liquid crystal layer. Alignment of the liquid crystal molecules in the liquid crystal layer changes in relation to the intensity of the induced electric field which alters the light transmissivity of the LCD device. Thus, the LCD device displays images by varying the intensity of the induced electric field within respective pixel regions that are provided with the LCD device.

LCD devices may be categorized into transmissive type, reflective type, and transflective type. Transmissive type LCDs require a backlight and consumes a relatively large amount of power during operation. Reflective type LCDs are operated with the aid of external light, and the brightness of the display is proportional to the amount of external light available. Transflective type LCDs are selectively operated in either transmissive or reflective modes. Transflective type LCD devices improve upon the disadvantages of the transmissive type and reflective type LCD devices.

Referring to FIG. 1, in an array substrate 1, a gate electrode 6, and a gate line (not shown) are formed on a first substrate 2. A gate insulating layer 10 is formed on the gate electrode 6. A semiconductor layer that is formed from an active layer 13 and an ohmic contact layer 16 is provided on the gate insulating layer 10 over the gate electrode 6. Source and drain electrodes 23, 26 are formed on the ohmic contact layer 16. Each of the gate electrode 6, the semiconductor layer, and the source and drain electrodes 23, 26 combine to form a thin film transistor Tr. A data line 20 is provided on the gate insulating layer 10. The data line 20 crosses the gate line to define a pixel region P. A first passivation layer 30 is formed on the data line 20 and the source and drain electrodes 23, 26. A reflective electrode 40 is formed on the first passivation layer 30 in a reflective region RA. A second passivation layer 45 is formed on the reflective electrode 40. A pixel electrode 50 is formed on the second passivation layer 45 in the pixel region P. The pixel electrode 50 contacts the drain electrode 26 through a drain contact hole 55.

In a color filter substrate 70, a black matrix 75 is formed on a second substrate 71. Red (R), green (G) and blue (B) color filters 80a, 80b, and 80c are formed in the corresponding pixel regions P. An overcoat layer 85 is formed on the color filters 80a, 80b and 80c. A common electrode 90 is formed on the overcoat layer 85.

A liquid crystal layer 60 is provided between the array substrate 1 and the color filter substrate 70. When voltages are applied to both the pixel and common electrodes 50, 90, an electric field is induced within the liquid layer 60, and the liquid crystal molecules therein are reoriented in proportion to the electric field. Although not shown in the drawings, an alignment layer is formed on each of the transparent and common electrodes 50, 90. Additionally, first and second retardation films 97, 95 may be formed on outer surfaces of the first and second substrates 2 and 71.

As best shown in FIG. 1, a cell gap $d_1$ (i.e. the thickness of the liquid crystal layer 60) of the reflective region RA is substantially the same as a cell gap $d_2$ of the transmissive region TA. In a reflective mode, an external light passes through the liquid crystal layer 60, then reflects on the reflective electrode 40, and then passes through the liquid crystal layer 60 again. Light in the reflective mode substantially travels as far through liquid crystal layer 60 as in the transmissive mode. Accordingly, there is a phase difference of light between the reflective and the transmissive modes.

To minimize or eliminate the phase difference, the transflective type LCD device of FIG. 2 provided. In the transflective type LCD device, a cell gap $d_4$ (i.e. the thickness of the liquid crystal layer 60) within the transmissive region TA is substantially twice the cell gap $d_3$ within the reflective region RA. Accordingly, the phase difference of FIG. 1 is substantially prevented because light travels through the same thickness of liquid crystal in both modes.

However, the transflective type LCD devices of FIGS. 1 and 2 have some problems. Light in the reflective mode passes through the color filter twice, and light in the transmissive mode passes through the color filter only once. Accordingly, color property differences between the reflective mode and the transmissive mode may occur. Also, the brightness in the reflective mode may be less than in the transmissive mode. Further, the reflectivity is reduced because the reflective electrode is flat.

Referring to FIG. 3, a through hole TH is formed in the color filters 80a, 80b and 80c in the reflective region RA. Light passing through the through hole TH in the reflective mode has substantially the same properties as light passing through the device in the transmissive mode, and brightness in the reflective mode is increased. Further, a first passivation layer 30 formed from two sub layers 30a, 30b has an uneven surface, which provides the reflective electrode 40 with a similar uneven surface. The uneven surface of the reflective electrode 40 increases the overall reflectivity. However, at least two mask processes are required to form the uneven surface. The additional mast process increase the fabrication time and product cost of an LCD device. Also, the processes of forming the uneven surface, makes it difficult to form a dual cell gap structure within the LCD panel.

BRIEF SUMMARY

A first representative embodiment of a liquid crystal display device includes an array substrate formed with reflective and transmissive regions in a pixel region, wherein the array substrate includes a reflective electrode corresponding to the reflective region and a pixel electrode on a first substrate. A color filter substrate with the reflective region and the transmissive region is provided in the pixel region that includes a color filter with first and second portions that correspond to the transmissive and reflective regions on a second substrate, respectively. The thickness of the second portion is less than a thickness of the first portion. A scatter layer is provided on the second portion. The combined thickness of the scatter layer and of the second portion is greater than the thickness of the first portion. A liquid crystal layer is provided between the array and color filter substrates.

Another representative embodiment of a liquid crystal display device includes an array substrate with reflective and transmissive regions formed in a pixel region. The array substrate includes a reflective electrode corresponding to the reflective region and a pixel electrode formed on a first substrate and a color filter substrate with the reflective and transmissive regions formed in the pixel region. The color filter substrate includes a color filter with a through hole in the reflective region on a second substrate and a scatter layer that includes a first portion filling the through hole. The thickness of the first portion is greater than the color filter. A liquid crystal layer is provided between the array and color filter substrates.

Another representative embodiment provides a method of fabricating a liquid crystal display device. The method includes the steps of fabricating an array substrate with reflective and transmissive regions in a pixel region and fabricating the array substrate to include a reflective electrode corresponding to the reflective region and a pixel electrode on a first substrate. A color filter substrate is provided with the reflective and transmissive regions in the pixel region. The method of forming the color filter includes the steps of forming the color filter substrate with first and second portions that correspond to the transmissive and reflective regions on a second substrate, respectively and interposing a liquid crystal layer between the array and color filter substrates, and forming a scatter layer on the second portion. The thickness of the second portion is less than a thickness of the first portion and the combined thickness of the scatter portion and the second portion is greater than the thickness of the first portion.

Another representative embodiment is a method of fabricating a liquid crystal display device that includes the steps of fabricating an array substrate having reflective and transmissive regions in a pixel region, including the steps of forming a reflective electrode corresponding to the reflective region and a pixel electrode on a first substrate and fabricating a color filter substrate having the reflective region and the transmissive region in the pixel region. The step of fabricating the color filter substrate includes the steps of forming a color filter with a through hole in the reflective region on a second substrate and forming a scatter layer with a first portion filling the through hole interposing a liquid crystal layer between the array and color filter substrates. The thickness of the first portion is greater than a thickness of the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a cross-sectional view illustrating a transflective type LCD device according to a third exemplary embodiment.

FIG. 7 is a cross-sectional view illustrating a transflective type LCD device according to a fourth exemplary embodiment.

FIGS. 8A to 8E are cross-sectional views illustrating a method of fabricating the color filter substrate according to the embodiment of FIG. 4.

DETAILED DESCRIPTION OF THE DRAWINGS AND THE PRESENTLY PREFERRED EMBODIMENTS

Reference will now be made in detail to the embodiments of the present invention, examples of which are illustrated in the accompanying drawings.

Figure 4:
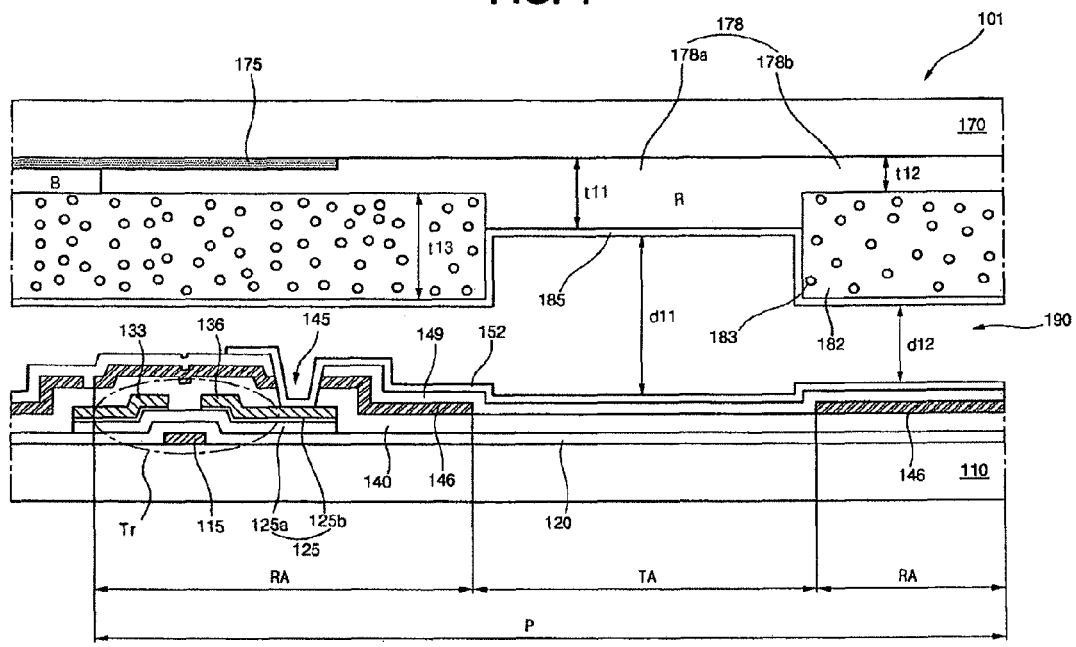
FIG. 4 is a cross-sectional view illustrating a transflective type LCD device according to a first exemplary embodiment.

Referring to FIG. 4, a transflective type LCD device 101 is provided that includes an array substrate, a color filter substrate and a liquid crystal layer 190 provided therebetween. In the array substrate, a gate electrode 115 and a gate line (not shown) are formed on a first substrate 110. A gate insulating layer 120 is formed on the first substrate 110 having the gate electrode 115. A semiconductor layer 125 is formed on the gate insulating layer 120 over the gate electrode 115. The semiconductor layer 125 includes an active layer 125a formed from intrinsic amorphous silicon and an ohmic contact layer 125b formed from impurity-doped amorphous silicon. Source and drain electrodes 133, 136 are formed on the ohmic contact layer 125b. A data line (not shown) is formed on the gate insulating layer 120, which is made of the same material as the source and drain electrodes 133, 136. The data line crosses the gate line to define a pixel region P. The gate electrode 115, the semiconductor layer 125 and the source and drain electrodes 133, 136 form a thin film transistor Tr.

A first passivation layer 140 is formed on the first substrate 110 having the source and drain electrodes 133, 136. The first passivation layer 140 may be formed from an organic insulating material such as benzocyclobutene (BCB) and acrylic resin. A top surface of the first passivation layer 140 is normally substantially flat. A reflective electrode 146 is formed on the first passivation layer 140 in a reflective region RA. The reflective electrode 146 has a transmissive hole corresponding to a transmissive region TA. A top surface of the reflective electrode 146 is substantially flat. The reflective electrode 146 be formed from a highly reflective material such as aluminum (Al). A second passivation layer 149 is formed on the first substrate 110 having the reflective electrode 146.

A drain contact hole 145 is formed through the first passivation layer 140, the reflective electrode 146, and the second passivation layer 149 to expose the drain electrode 136. A pixel electrode 152 is formed on the second passivation layer 140 in the pixel region P and contacts the drain electrode 136 through the drain contact hole 145. The pixel electrode 152 may also contact the reflective electrode 146 through the drain contact hole 145. The pixel electrode 152 may be formed from a transparent conductive material such as indium-tin-oxide (ITO), indium-zinc-oxide (IZO), or indium-tin-zinc-oxide (ITZO). A height of the array substrate within the reflective region RA is substantially the same as a height of the array substrate within the transmissive region TA. A black matrix 175 is formed on a second substrate 170 in the color filter substrate. The black matrix 175 may correspond to the thin film transistor T, and the gate and data lines.

A color filter 178 is formed in the corresponding pixel region P. The color filter 178 includes red (R), green (G) and blue (B) color filters. The color filter 178 has a first portion 178a that corresponds to the transmissive region TA and a second portion 178b that corresponds to the reflective region RA. The thickness t11 of the first portion 178a is greater than the thickness t12 of the second portion 178b. For example, the thickness t11 of the first portion 178a is substantially twice the thickness t12 of the second portion 178b. While light in a reflective mode passes through the color filter 178 twice, and light in a transmissive mode passes through the color filter 178 once, because the first portion 178a has twice the thickness of the second portion 178b, the color in the reflective mode can be substantially the same as that in the transmissive mode.

Figure 1:
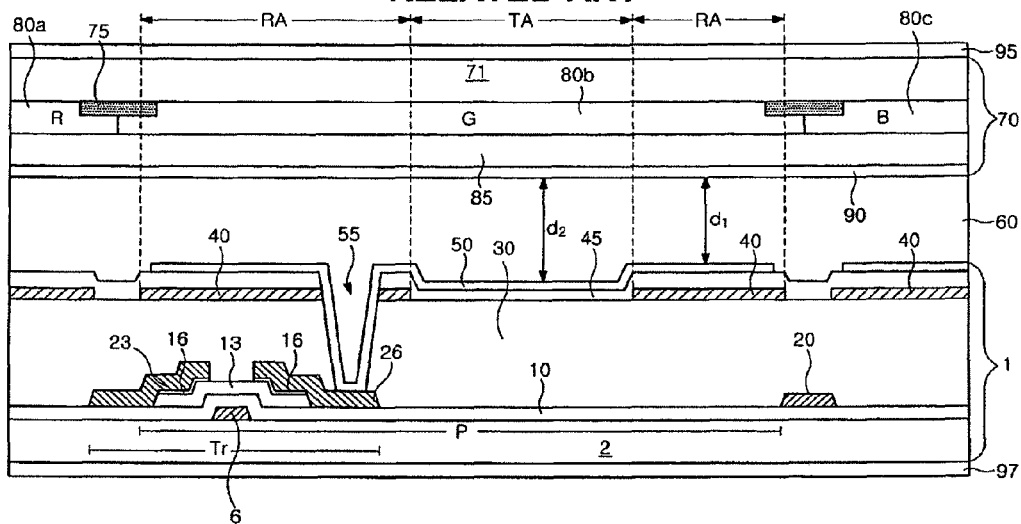
FIGS. 1 to 3 are cross-sectional views illustrating examples of transflective type LCD devices according to the related art.
Figure 2:
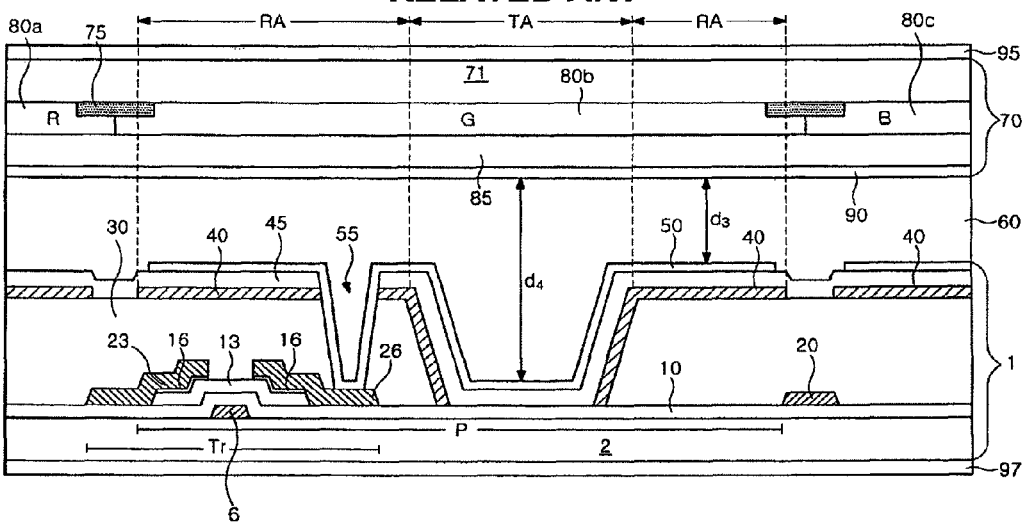
Figure 3:
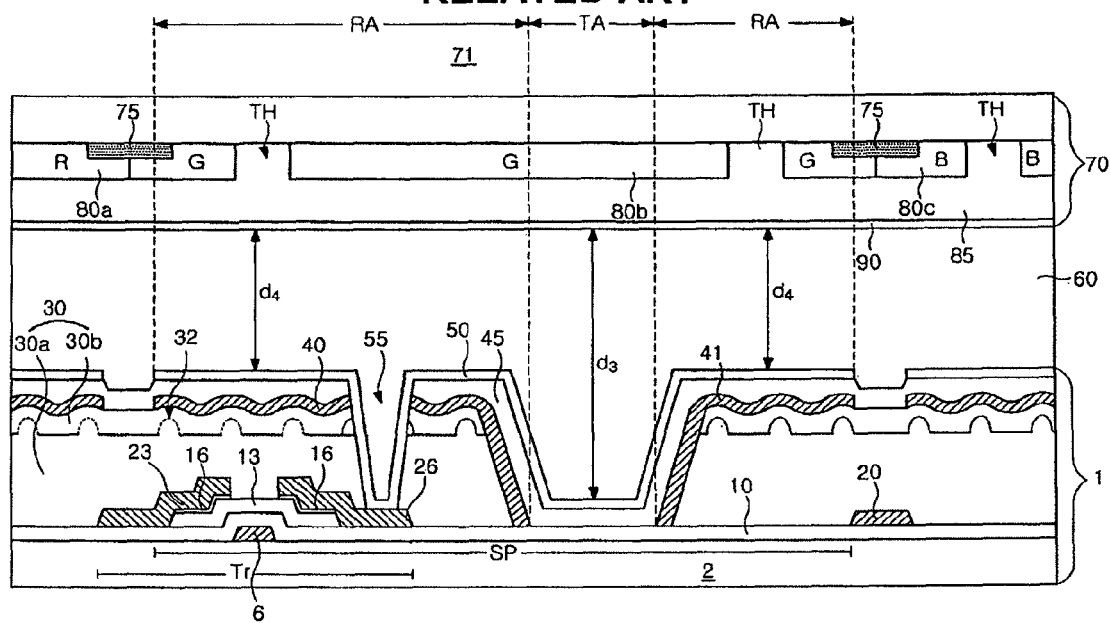

A scatter layer 182 is provided on the second portion 178b that may be formed from a transparent organic insulating material such as a photoresist and a photo acrylic. The scatter layer 182 includes a plurality of beads 183 that scatters light. The beads 183 may be arranged within the scatter layer 182 so that the beads 183 can function as an uneven pattern as shown in FIG. 3. The thickness t13 of the scatter layer 182 is such that a cell gap d11 (i.e. the thickness of the liquid crystal layer 190) of the transmissive region TA is substantially twice a cell gap d12 of the reflective region RA. In some embodiments, the thickness t13 of the scatter layer 182 may be one and half times greater the thickness t11 of the first portion 178a. A common electrode 185 is formed on the second substrate 170 from a transparent conductive material such as indium-tin-oxide (ITO), indium-zinc-oxide (IZO), or indium-tin-zinc-oxide (ITZO).

As described above, the reflective region of the color filter has a smaller thickness than the transmissive region. Accordingly, the transflective type LCD device can have substantially the same color properties (brightness, shade, etc.) in the reflective mode and the transmissive mode. Further, the scatter layer 182 has beads 183 and is formed on the color filter layer in the reflective region to provide the high reflectivity and the dual cell gap structure.

Figure 5:
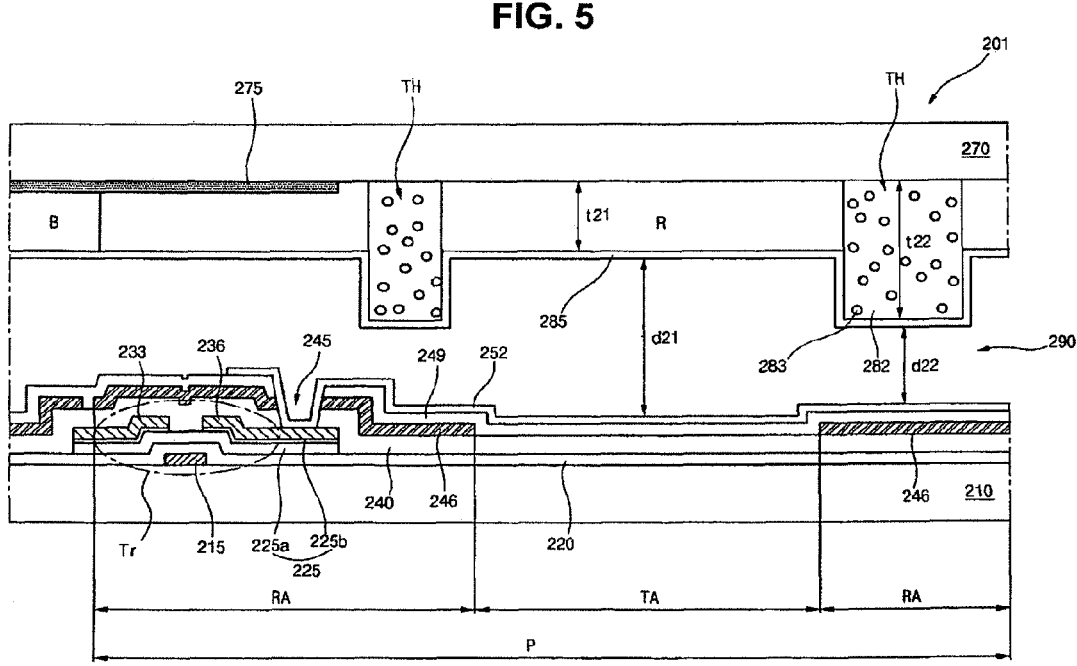
FIG. 5 is a cross-sectional view illustrating a transflective type LCD device according to a second exemplary embodiment.

FIG. 5 is a cross-sectional view illustrating a transflective type LCD device according to a second exemplary embodiment of the present invention. The LCD device is similar to that of the first exemplary embodiment except for the color filter and the scatter layer. Accordingly, explanations of parts similar to parts of the first exemplary embodiment are not repeated here for the sake of brevity.

The color filter in a transmissive region TA has approximately the same thickness t21 as the color filter in a reflective region RA. A through hole TH is formed in the color filter in the reflective region RA, which allows color properties to be substantially the same in the reflective and transmissive modes. A scatter layer 282 fills the through hole TH and is arranged with a thickness t22 such that the cell gap d21 (i.e. the thickness of the liquid crystal layer 290) in the transmissive region TA is substantially twice the cell gap d22 in the reflective region RA that corresponds to the through hole TH. The thickness t22 of the scatter layer 282 may be twice the thickness t21 of the color filter, which accordingly achieves the dual cell gap structure.

FIG. 6 is a cross-sectional view illustrating a transflective type LCD device according to a third exemplary embodiment of the present invention. The LCD device of FIG. 6 is similar to that of the second exemplary embodiment except for the structure of the scatter layer. Accordingly, an explanation of parts similar to parts of the second exemplary embodiment is not repeated here for the sake of brevity.

Similar to the second exemplary embodiment, a color filter in a transmissive region TA substantially has the same thickness t31 as the color filter in a reflective region RA and a through hole TH is formed in the color filter in the reflective region RA. By forming the through hole TH, the color properties may be substantially the same in the reflective and transmissive modes.

A scatter layer 382 includes first and second portions 382a and 382b. The first portion 382a fills the through hole TH, as is similar to the scatter layer discussed with respect to the second exemplary embodiment. The second portion 382b is formed on the color filter in the reflective region RA. The second portion 382b has a thickness t32 and the first portion 382a has a thickness (t31+t32) such that a cell gap d31 within the transmissive region TA is substantially twice a cell gap d32 within the reflective region RA. Further, the thickness t32 of the second portion 382b may the same as the thickness t31 of the color filter, which allows for the dual cell gap structure.

FIG. 7 is a cross-sectional view illustrating a transflective type LCD device according to a fourth exemplary embodiment of the present invention. The LCD device depicted in FIG. 7 is similar to that of the first exemplary embodiment except for the structure of the array substrate and the common electrode. Accordingly, explanations of parts similar to parts of the first exemplary embodiment are not repeated here for the sake of brevity.

The LCD device of the first exemplary embodiment is operated with the electric field that is induced vertically by the pixel electrode of the array substrate and the common electrode of the color filter substrate. The LCD device 401 of the current exemplary embodiment is operated with an in-plane electric field that is induced horizontally by a pixel electrode 452 and reflective and common electrodes 417 and 418 of an array substrate.

Referring to FIG. 7, in the array substrate, the reflective electrode 417 is formed on a first substrate 410 in a reflective region RA. The reflective electrode 417 may be made of the same material as a gate electrode 415. A common electrode 418 is formed on the first substrate 410 corresponding to a transmissive hole of the reflective electrode 417. The common electrode 418 contacts the reflective electrode 417. The common electrode 418 may be formed from a transparent conductive material such as indium-tin-oxide (ITO), indium-zinc-oxide (IZO), or indium-tin-zinc-oxide (ITZO). A gate insulating layer 420 is on the first substrate 410 and has the gate electrode 415, the reflective electrode 417, and the common electrode 418.

A passivation layer 440 is formed on the first substrate 410 having the source and drain electrodes 433, 436. The passivation layer 440 has a drain contact hole 445 exposing the drain electrode 436. A plurality of pixel electrodes 452 are formed on the passivation layer 440 in the pixel region P. The pixel electrodes 452 induce an in-plane electric field with the location of the reflective and common electrodes 417, 418 below the pixel electrode 452. The LCD device of the fourth exemplary embodiment is referred to as a FFS (fringe field switching) mode LCD device. Alternately, an IPS (in-plane switching) mode LCD device may be provided. In the IPS mode LCD device, a plurality of pixel electrodes and a plurality of common electrodes are alternately arranged to induce an in-plane electric field.

The structure to induce the in-plane electric field may be substituted in the second and third exemplary embodiments discussed above.

FIGS. 8A to 8E are cross-sectional views of a method for fabricating the color filter substrate according to the first exemplary embodiment of the present invention shown in FIG. 4.

Figure 8A:
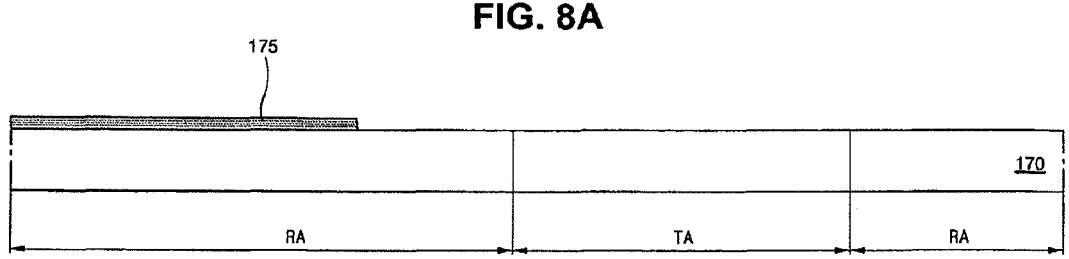

As shown in FIG. 8A, a black matrix 175 is formed on a substrate 170 with a mask process. The black matrix 175 may be formed from chromium (Cr), chromium oxide (CrOx), or black resin.

Figure 8B:
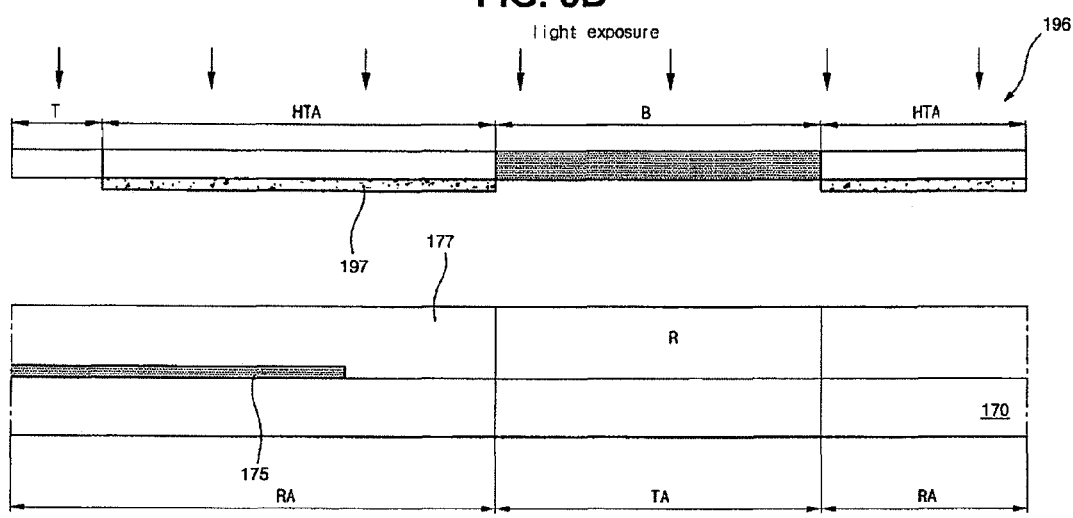

As shown in FIG. 8B, a red (R) resist layer 177 is formed on the substrate 170 having the black matrix 175. A mask 196 is located over the red (R) resist layer 177. The mask 196 has a transmitting portion T, a semi-transmitting portion HTA, and a blocking portion B. The transmitting portion T has a relatively high transmittance to allow for transmission of light, the blocking portion B has a relatively low transmittance to block a significant amount of light, and the semi-transmitting portion HTA has a light transmittance between the transmitting portion T and the blocking portion B. The semi-transmitting portion HTA may have a multi-coating layer 197.

The blocking portion B corresponds to a transmissive region TA and the semi-transmitting portion HTA corresponds to a reflective region RA. The transmitting portion T may be between the blocking portions B and the semi-transmitting portions HTA.

A light exposure is performed for the red (R) resist layer 177. For example, the red (R) resist layer 177 may be a positive type. When the red (R) resist layer 177 is a negative type, positions of the blocking portion B and the transmitting portion T are altered. After the light exposure, the red (R) resist layer 177 is developed.

Figure 8C:
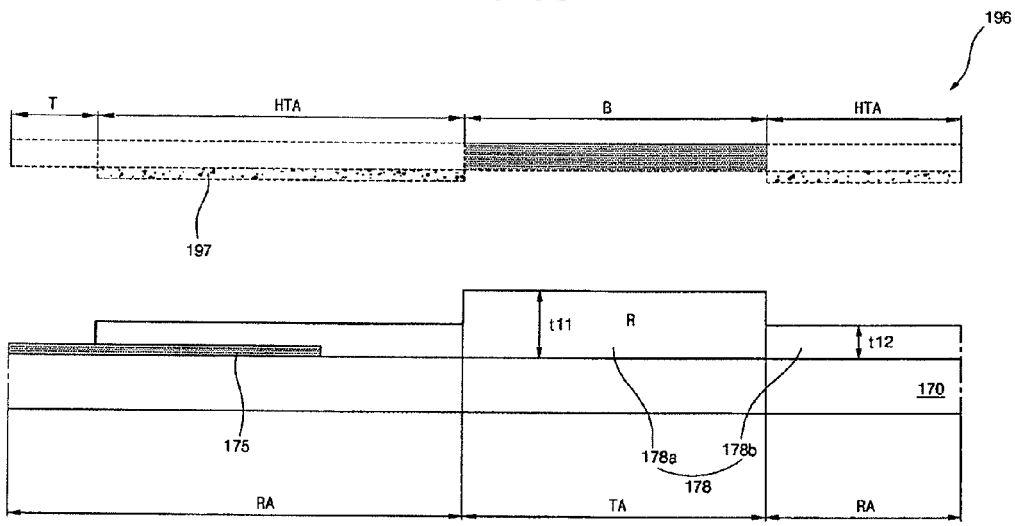

Turning now to FIG. 8C, after exposing and developing the red (R) resist layer 177, a red (R) color filter 178 is formed in a pixel region P. A first portion 178a of the red (R) color filter 178 that corresponds to the transmissive region TA has a thickness t11 and a second portion 178b of the red (R) color filter 178 that corresponds to the reflective region RA has a thickness t12. The blue and green color filters may be formed in the same manner as discussed above.

The color filters of the second and third exemplary embodiments may be formed using a mask where the transmitting portions and the blocking portions are alternately arranged in the reflective region RA instead of the semi-transmitting portion HTA of FIG. 8B. In other words, the transmitting portion corresponds to the through hole (TH of FIGS. 5 and 6), and the blocking portion is between the transmitting portion in the reflective region RA.

Figure 8D:
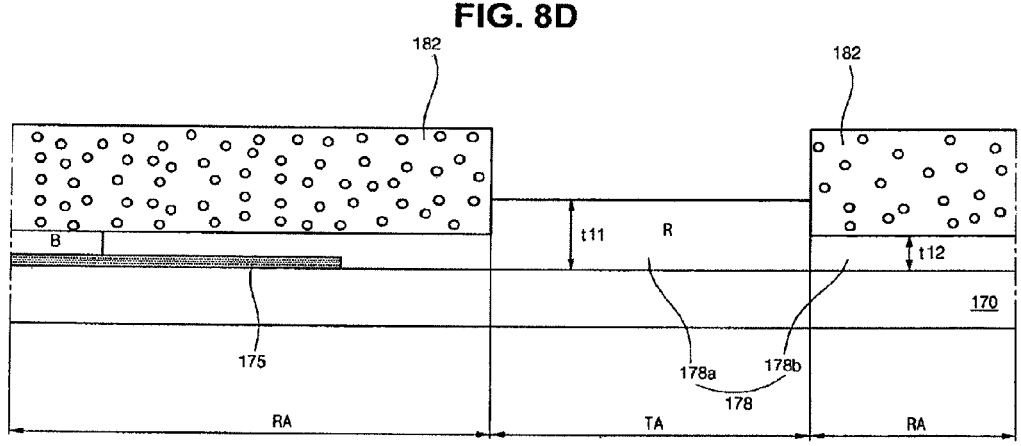

Referring to FIG. 8D, an organic insulating material having a plurality of beads is deposited on the substrate 170 having the red (R), green, and blue (B) color filters and is patterned with a mask process to form a scatter layer 182 in the reflective region RA. Accordingly, the color filter substrate that corresponds to the reflective region RA is thicker than the color filter substrate that corresponds to the transmissive region TA. The cell gap of the transmissive region is substantially twice a cell gap of the reflective region due to the thickness relationship between the color filter and the scatter layer.

Referring to FIG. 8E, a common electrode 185 is formed on the substrate 170 having the scatter layer 182. In the fourth exemplary embodiment, the common electrode is not formed in the color filter substrate, and an over coat layer may be formed on the substrate having the scatter layer.

Through the above processes, the color filter substrate according to the first exemplary embodiment of the present invention is fabricated. The transflective LCD device is fabricated by attaching the color filter substrate and the array substrate and interposing the liquid crystal layer between the two substrates.

As explained in the exemplary embodiments, the reflective region of the color filter has a smaller thickness than the transmissive region of the color filter, or the reflective region of the color filter is provided with a through hole. Accordingly, the transflective type LCD device may have substantially the same color properties in both the reflective and transmissive modes. Further, a scatter layer with beads may be formed in the reflective region. Accordingly, the high reflectivity and the dual cell gap structure can be achieved with a relatively simple processes and at a low cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A liquid crystal display device, comprising:
   an array substrate having reflective and transmissive regions in a pixel region, wherein the array substrate includes a reflective electrode corresponding to the reflective region, and a pixel electrode provided on a first substrate;
   a color filter substrate having the reflective region and the transmissive region in the pixel region, the color filter substrate comprising:
      a color filter provided on a second substrate, the color filter comprising a through hole in the reflective region; and
      a scatter layer including a first portion filling the through hole, wherein a thickness of the first portion is greater than a thickness of the color filter; and
      a liquid crystal layer between the array and color filter substrates.

2. The device according to claim 1, wherein the thickness of the color filter layer and the first portion are such that a cell gap of the liquid crystal layer corresponding to the transmissive region is substantially twice a cell gap of the liquid crystal layer corresponding to the through hole.

3. The device according to claim 2, wherein a thickness of the array substrate corresponding to the transmissive region is substantially the same as a thickness of the array substrate corresponding to the reflective region.

4. The device according to claim 2, wherein the thickness of the first portion is substantially twice the thickness of the color filter.

5. The device according to claim 1, wherein the scatter layer further includes a second portion on the color filter corresponding to the reflective region.

6. The device according to claim 5, wherein the thickness of the color filter layer and the first and second portions are such that a cell gap of the liquid crystal layer corresponding to the transmissive region is substantially twice a cell gap of the liquid crystal layer corresponding to the reflective region.

7. The device according to claim 6, wherein a thickness of the array substrate corresponding to the transmissive region is substantially the same as a thickness of the array substrate corresponding to the reflective region.

8. The device according to claim 6, wherein the thickness of the first portion is substantially twice the thickness of the color filter, and the thickness of the second portion is substantially the same as the thickness of the color filter.

9. The device according to claim 1, wherein the scatter layer includes a plurality of beads for scattering light.

10. The device according to claim 1, wherein the color filter substrate further comprises a common electrode provided on the scatter layer and the color filter layer corresponding to the transmissive region.

11. The device according to claim 1, wherein the array substrate further includes a common electrode inducing an in-plane electric field with the pixel electrode.

12. The device according to claim 11, wherein the common electrode corresponds to a transmissive hole of the reflective electrode corresponding to the transmissive region and is connected to the reflective electrode.

13. The device according to claim 11, wherein the pixel electrode and the common electrode are alternately arranged.

14. The device according to claim 1, wherein the pixel electrode corresponds to the pixel region.

15. A method of fabricating a liquid crystal display device, comprising the steps of:
fabricating an array substrate having reflective and transmissive regions in a pixel region, wherein the step of fabricating the array substrate comprises the steps of forming a reflective electrode corresponding to the reflective region and a pixel electrode on a first substrate;
fabricating a color filter substrate having the reflective region and the transmissive region in the pixel region, the step of fabricating the color filter substrate comprises the steps of:
forming a color filter having a through hole in the reflective region on a second substrate; and
forming a scatter layer including a first portion filling the through hole, wherein a thickness of the first portion is greater than a thickness of the color filter; and
interposing a liquid crystal layer between the array and color filter substrates.

16. The method according to claim 15, wherein the step of forming the color filter comprises the step of:
forming a color resist layer on the second substrate; and
patterning the color resist layer using a mask having a blocking portion and a transmitting portion, wherein the transmissive region corresponds to the blocking portion and the reflective region corresponds to the blocking portion and the transmitting portion alternately arranged.

17. The method according to claim 15, wherein the thickness of the color filter layer and the first portion are such that a cell gap of the liquid crystal layer corresponding to the transmissive region is substantially twice a cell gap of the liquid crystal layer corresponding to the through hole.

18. The method according to claim 17, wherein a height of the array substrate corresponding to the transmissive region is substantially the same as a height of the array substrate corresponding to the reflective region.

19. The method according to claim 17, wherein the thickness of the first portion is substantially twice the thickness of the color filter.

20. The method according to claim 15, wherein the scatter layer further includes a second portion on the color filter corresponding to the reflective region.

21. The method according to claim 20, wherein the thickness of the color filter layer and the first and second portions are such that a cell gap of the liquid crystal layer corresponding to the transmissive region is substantially twice a cell gap of the liquid crystal layer corresponding to the reflective region.

22. The method according to claim 21, wherein a height of the array substrate corresponding to the transmissive region is substantially the same as a height of the array substrate corresponding to the reflective region.

23. The method according to claim 21, wherein the thickness of the first portion is substantially twice the thickness of the color filter, and the thickness of the second portion is substantially the same as the thickness of the color filter.

24. The method according to claim 15, wherein the scatter layer includes a plurality of beads for scattering light.

25. The method according to claim 15, wherein the step of fabricating the color filter substrate further comprises the step of forming a common electrode on the scatter layer and the color filter layer corresponding to the transmissive region.

26. The method according to claim 15, wherein the step of fabricating the array substrate further comprises the step of forming a common electrode inducing an in-plane electric field with the pixel electrode.

27. The method according to claim 26, wherein the common electrode corresponds to a transmissive hole of the reflective electrode corresponding to the transmissive region and is connected to the reflective electrode.

28. The method according to claim 26, wherein the pixel electrode and the common electrode are alternately arranged.

29. The method according to claim 15, wherein the pixel electrode corresponds to the pixel region.

* * * * *